United States Patent
Slavens et al.

(10) Patent No.: US 10,612,392 B2
(45) Date of Patent: Apr. 7, 2020

(54) GAS TURBINE ENGINE COMPONENT WITH CONFORMAL FILLET COOLING PATH

(71) Applicant: United Technologies Corporation, Hartford, CT (US)

(72) Inventors: Thomas N. Slavens, Vernon, CT (US); Brooks E. Snyder, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 725 days.

(21) Appl. No.: 14/923,511

(22) Filed: Oct. 27, 2015

(65) Prior Publication Data

US 2016/0177740 A1 Jun. 23, 2016

Related U.S. Application Data

(60) Provisional application No. 62/093,529, filed on Dec. 18, 2014.

(51) Int. Cl.
*F01D 5/18* (2006.01)
*F23R 3/00* (2006.01)
*F01D 5/14* (2006.01)

(52) U.S. Cl.
CPC ............ *F01D 5/187* (2013.01); *F01D 5/143* (2013.01); *F23R 3/002* (2013.01);
(Continued)

(58) Field of Classification Search
CPC .... F01D 5/143; F01D 5/187; F05D 2200/263; F05D 2230/21; F05D 2240/81;
(Continued)

(56) References Cited

U.S. PATENT DOCUMENTS

| 5,340,278 A | 8/1994 | Magowan |
| 6,758,651 B2 * | 7/2004 | Tomita ............... F01D 5/18 415/115 |

(Continued)

FOREIGN PATENT DOCUMENTS

| EP | 1688587 A2 | 8/2006 |
| EP | 2666965 A1 | 11/2013 |

(Continued)

OTHER PUBLICATIONS

European Search Report for European Application No. 15200725.8 dated Jun. 15, 2016.

*Primary Examiner* — William M McCalister
(74) *Attorney, Agent, or Firm* — Carlson, Gaskey & Olds, P.C.

(57) ABSTRACT

A cooling circuit for a gas turbine engine comprises a gas turbine engine component having a first portion connected to a second portion via a curved surface. An inlet is formed in or near one of the first and second portions to receive a cooling air flow. An outlet is formed in or near the other of the first and second portions to direct cooling flow along a surface of the gas turbine engine component. At least one cooling path extends between the inlet and the outlet and has at least one cooling path portion that conforms in shape to the curved surface. A gas turbine engine and a method of forming a cooling circuit for a gas turbine engine are also disclosed.

13 Claims, 4 Drawing Sheets

(52) U.S. Cl.
CPC .... *F05D 2200/263* (2013.01); *F05D 2230/21* (2013.01); *F05D 2240/81* (2013.01); *F05D 2250/322* (2013.01); *F05D 2250/71* (2013.01); *F05D 2260/202* (2013.01); *Y02T 50/673* (2013.01); *Y02T 50/676* (2013.01)

(58) Field of Classification Search
CPC .......... F05D 2250/322; F05D 2250/71; F05D 2260/202; F23R 3/002; Y02T 50/673; Y02T 50/676
See application file for complete search history.

(56) References Cited

U.S. PATENT DOCUMENTS

| | | | |
|---|---|---|---|
| 6,830,432 B1 | 12/2004 | Scott et al. | |
| 7,217,094 B2 | 5/2007 | Cunha et al. | |
| 7,220,103 B2 | 5/2007 | Cunha et al. | |
| 7,249,933 B2 | 7/2007 | Lee et al. | |
| 7,351,036 B2 | 4/2008 | Liang | |
| 7,597,536 B1* | 10/2009 | Liang | F01D 5/147 |
| | | | 415/115 |
| 7,600,972 B2* | 10/2009 | Benjamin | F01D 5/187 |
| | | | 29/889.21 |
| 7,866,950 B1 | 1/2011 | Wilson, Jr. | |
| 7,905,706 B1* | 3/2011 | Liang | F01D 5/14 |
| | | | 415/115 |
| 7,927,073 B2* | 4/2011 | Scott | F01D 5/187 |
| | | | 416/193 A |
| 8,047,789 B1 | 11/2011 | Liang | |
| 8,057,183 B1 | 11/2011 | Liang | |
| 8,066,483 B1 | 11/2011 | Liang | |
| 8,092,176 B2 | 1/2012 | Liang | |
| 8,096,766 B1 | 1/2012 | Downs | |
| 8,109,726 B2 | 2/2012 | Liang | |
| 8,162,609 B1 | 4/2012 | Liang | |
| 8,251,665 B2* | 8/2012 | Baldauf | F01D 5/22 |
| | | | 416/193 A |
| 8,317,475 B1 | 11/2012 | Downs | |
| 8,322,988 B1 | 12/2012 | Downs et al. | |
| 8,668,454 B2* | 3/2014 | Wiebe | F01D 5/18 |
| | | | 416/97 R |
| 8,727,725 B1 | 5/2014 | Liang | |
| 9,156,114 B2 | 10/2015 | Pal et al. | |
| 2010/0003619 A1 | 1/2010 | Das et al. | |
| 2010/0054954 A1* | 3/2010 | Itzel | F01D 5/186 |
| | | | 416/97 R |
| 2010/0310367 A1 | 12/2010 | Devore et al. | |
| 2011/0223005 A1 | 9/2011 | Lee et al. | |
| 2012/0076654 A1* | 3/2012 | Maldonado | F01D 5/186 |
| | | | 416/95 |
| 2012/0087803 A1 | 4/2012 | Butler et al. | |
| 2012/0163993 A1 | 6/2012 | Levine et al. | |
| 2013/0232991 A1 | 9/2013 | Otero | |
| 2013/0312941 A1* | 11/2013 | Bunker | F01D 5/187 |
| | | | 165/133 |
| 2013/0336767 A1 | 12/2013 | Levine et al. | |
| 2014/0130354 A1* | 5/2014 | Pal | B23H 9/14 |
| | | | 29/889.22 |
| 2014/0130514 A1 | 5/2014 | Pal | |

FOREIGN PATENT DOCUMENTS

| | | | | |
|---|---|---|---|---|
| EP | 2730746 A1 * | 5/2014 | ............ | F01D 25/12 |
| WO | 2014151239 | 9/2014 | | |

* cited by examiner

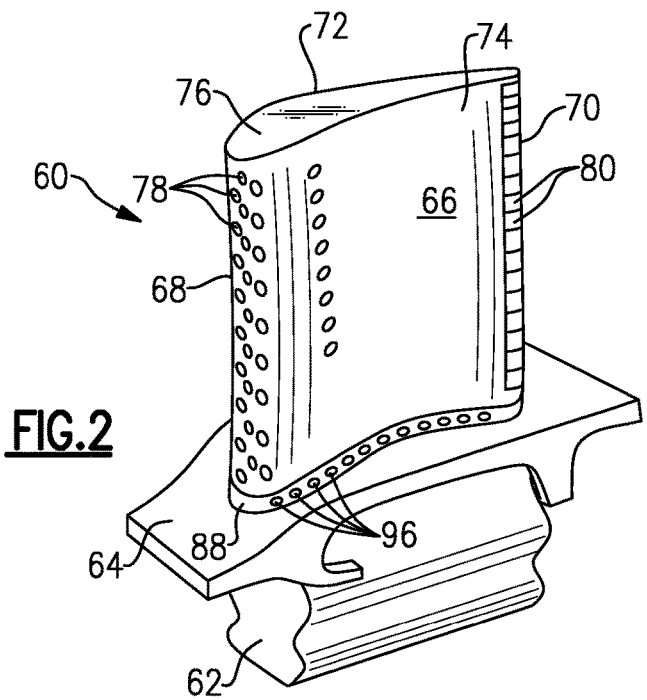
FIG.2
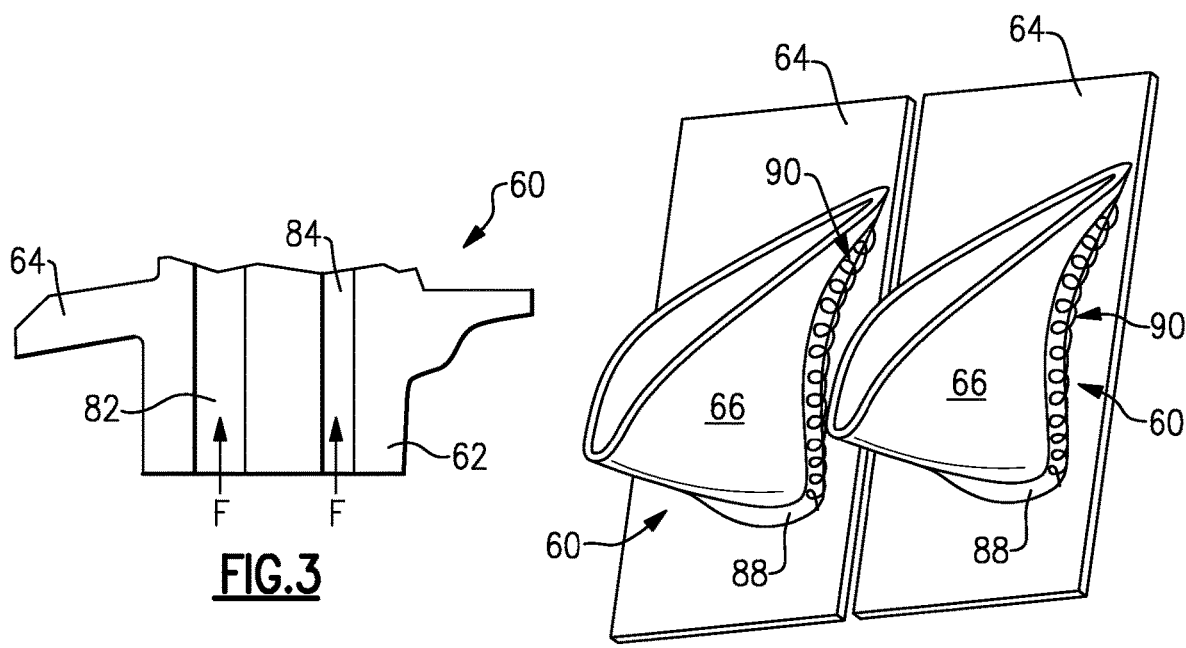
FIG.3
FIG.4

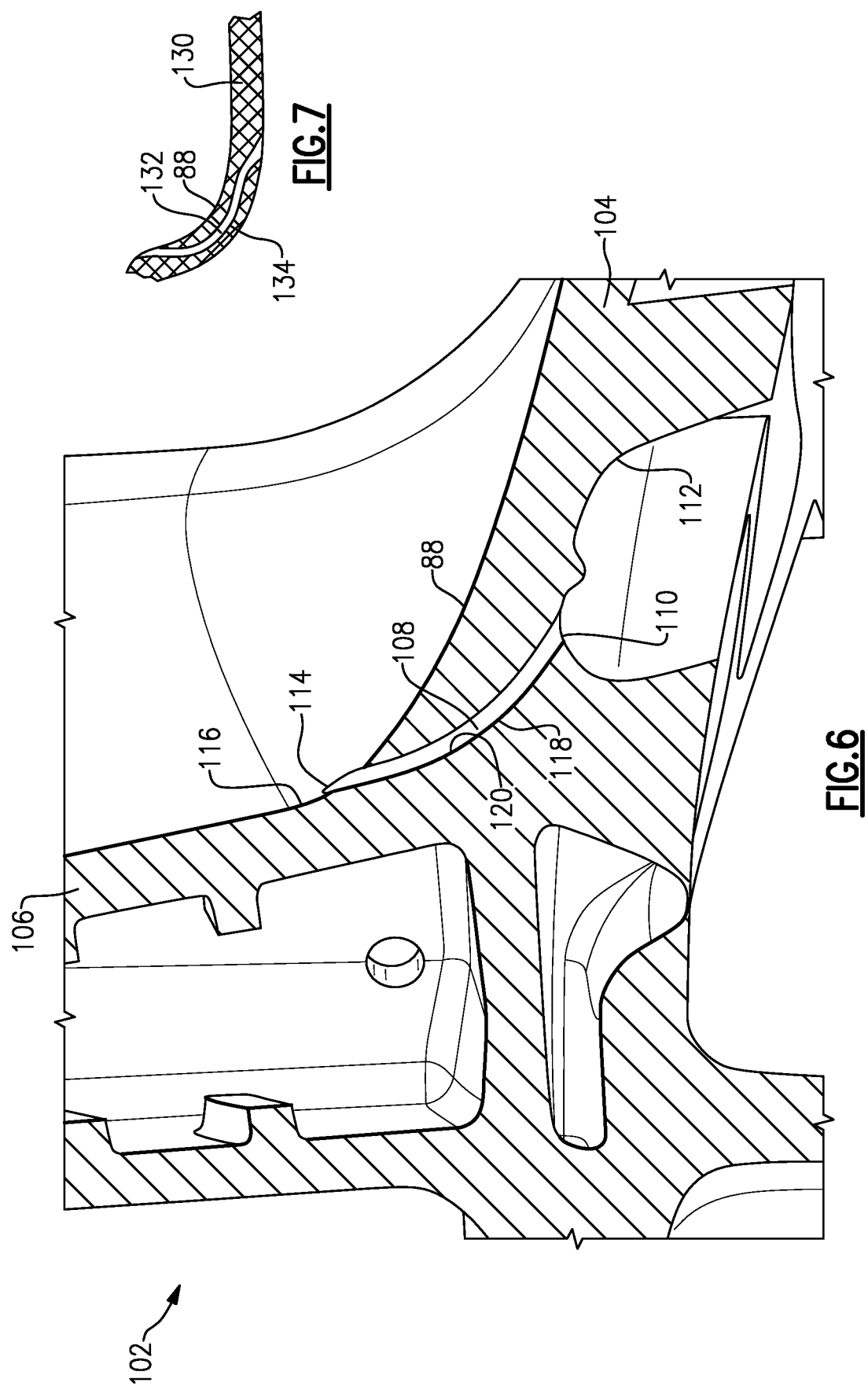

GAS TURBINE ENGINE COMPONENT WITH CONFORMAL FILLET COOLING PATH

CROSS-REFERENCE TO RELATED APPLICATION

This application claims priority to U.S. Provisional Patent Application No. 62/093,529, filed Dec. 18, 2014.

BACKGROUND OF THE INVENTION

Advancements in turbomachinery performance have been linked to turbine inlet temperatures that can be reliably sustained during service. Increases in efficiency through this method typically produces a hotter operating environment for turbine flow path components and hardware in which the working fluid is several hundreds of degrees higher than the melting point of component alloys. In one example, to protect components while operating in these high temperature environments, dedicated cooling air is extracted from a compressor section and is used to cool gas path components in a turbine section, such as rotating blades and stator vanes for example, incurring significant cycle penalties.

One method of cooling extremely high temperature applications utilizes film cooling in combination with backside convection. This method uses cooling air delivered internally of the component to emit from cooling holes a cooling flow over an external surface of the component which then results in a reduction of local external surface temperatures at downstream locations. These cooling holes are typically formed using an Electrical Discharge Machining (EDM) or laser drilling process. These processes typically form straight line holes that have round or diffuser shaped openings.

One location that is difficult to effectively cool is any filleted region that connects one portion of a component to another portion. For example, the curved region that connects an airfoil to inner and outer flowpath endwalls is extremely difficult to cool. This interface is highly, mechanically loaded and therefore must have very large fillet radii to reduce stress concentrations. Various methods have ineffectively been used to cool this area. Examples of such methods include using internal holes to cool the area which can further increase stress concentrations, and forming cooling hole exits on the endwall itself and then directing cooling flow toward the fillet which is highly inefficient.

SUMMARY OF THE INVENTION

In a featured embodiment, a cooling circuit for a gas turbine engine comprises a gas turbine engine component having a first portion connected to a second portion via a curved surface. An inlet is formed in or near one of the first and second portions to receive a cooling air flow. An outlet is formed in or near the other of the first and second portions to direct cooling flow along a surface of the gas turbine engine component. At least one cooling path extends between the inlet and the outlet and has at least one cooling path portion that conforms in shape to the curved surface.

In another embodiment according to the previous embodiments, the outlet is tangential to the curved surface.

In another embodiment according to any of the previous embodiments, the inlet is tangential to the curved surface.

In another embodiment according to any of the previous embodiments, the inlet and outlet are tangential to the curved surface.

In another embodiment according to any of the previous embodiments, the at least one cooling path portion defines an internal curved path surface that curves from the inlet to the outlet.

In another embodiment according to any of the previous embodiments, the curved surface comprises a fillet region.

In another embodiment according to any of the previous embodiments, the at least one cooling path is defined by a radius of curvature that has an oblique tangential intersection with the fillet region.

In another embodiment according to any of the previous embodiments, the gas turbine engine component comprises one of a blade, a vane, a BOAS, or a combustor panel. The at least one cooling path comprises at least one of a cooling hole or cooling channel.

In another embodiment according to any of the previous embodiments, the gas turbine engine component comprises a vane with the first portion comprising a platform and the second portion comprising an airfoil connected to the platform via the curved surface which forms a fillet region.

In another embodiment according to any of the previous embodiments, the inlet is formed within the platform and the outlet is formed in the airfoil adjacent an outward portion of the fillet region spaced away from the platform such that cooling air flow is directed along an external surface of the airfoil.

In another embodiment according to any of the previous embodiments, the gas turbine engine component comprises a blade with the first portion comprising a platform and the second portion comprising an airfoil connected to the platform via the curved surface which forms a fillet region.

In another embodiment according to any of the previous embodiments, the inlet is formed within the airfoil and the outlet is formed in the platform adjacent an inward portion of the fillet region near the platform such that cooling air flow is directed along an external surface of the fillet region.

In another embodiment according to any of the previous embodiments, the airfoil includes an internal cooling channel. The inlet receives cooling air flow from the internal cooling channel.

In another featured embodiment, a gas turbine engine comprises a compressor section, a combustor section downstream of the compressor section, and a turbine section downstream of the combustor section. At least one of the combustor section and the turbine section include a component having a first portion connected to a second portion via a curved surface. An inlet is formed in or near one of the first and second portions to receive a cooling air flow. An outlet is formed in or near the other of the first and second portions to direct cooling flow along a surface of the gas turbine engine component. At least one cooling path extends between the inlet and the outlet and has at least one cooling path portion that conforms in shape to the curved surface.

In another embodiment according to the previous embodiment, the outlet is tangential to the curved surface.

In another embodiment according to any of the previous embodiments, the inlet is tangential to the curved surface.

In another embodiment according to any of the previous embodiments, the inlet and outlet are tangential to the curved surface.

In another embodiment according to any of the previous embodiments, the curved surface comprises a fillet region. The at least one cooling path portion defines an internal curved path surface that curves from the inlet to the outlet.

In another featured embodiment, method of forming a cooling circuit for a gas turbine engine comprises the steps of providing a gas turbine engine component having a first portion connected to a second portion via a curved surface. At least one cooling path is casted in the gas turbine engine component to extend between an inlet and an outlet to direct cooling flow along an external surface of the gas turbine engine component. At least a portion of the at least one cooling path is cast to conform in shape to the curved surface.

In another embodiment according to any of the previous embodiments, at least one of the inlet and outlet is formed to be tangential to the curved surface.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 2 is a side perspective view of a turbine blade.

FIG. 3 is a schematic cross-sectional view of a root section of the blade of FIG. 2.

FIG. 4 is a schematic top view of a pair of adjacent blades that show a fillet region.

FIG. 6 is a cross-sectional side view of a vane and a conformal cooling hole in a fillet region.

FIG. 7 is a schematic cross-sectional view of a blade outer air seal (BOAS) or combustor panel component with a conformal cooling hole in a fillet region.

DETAILED DESCRIPTION

Figure 1:
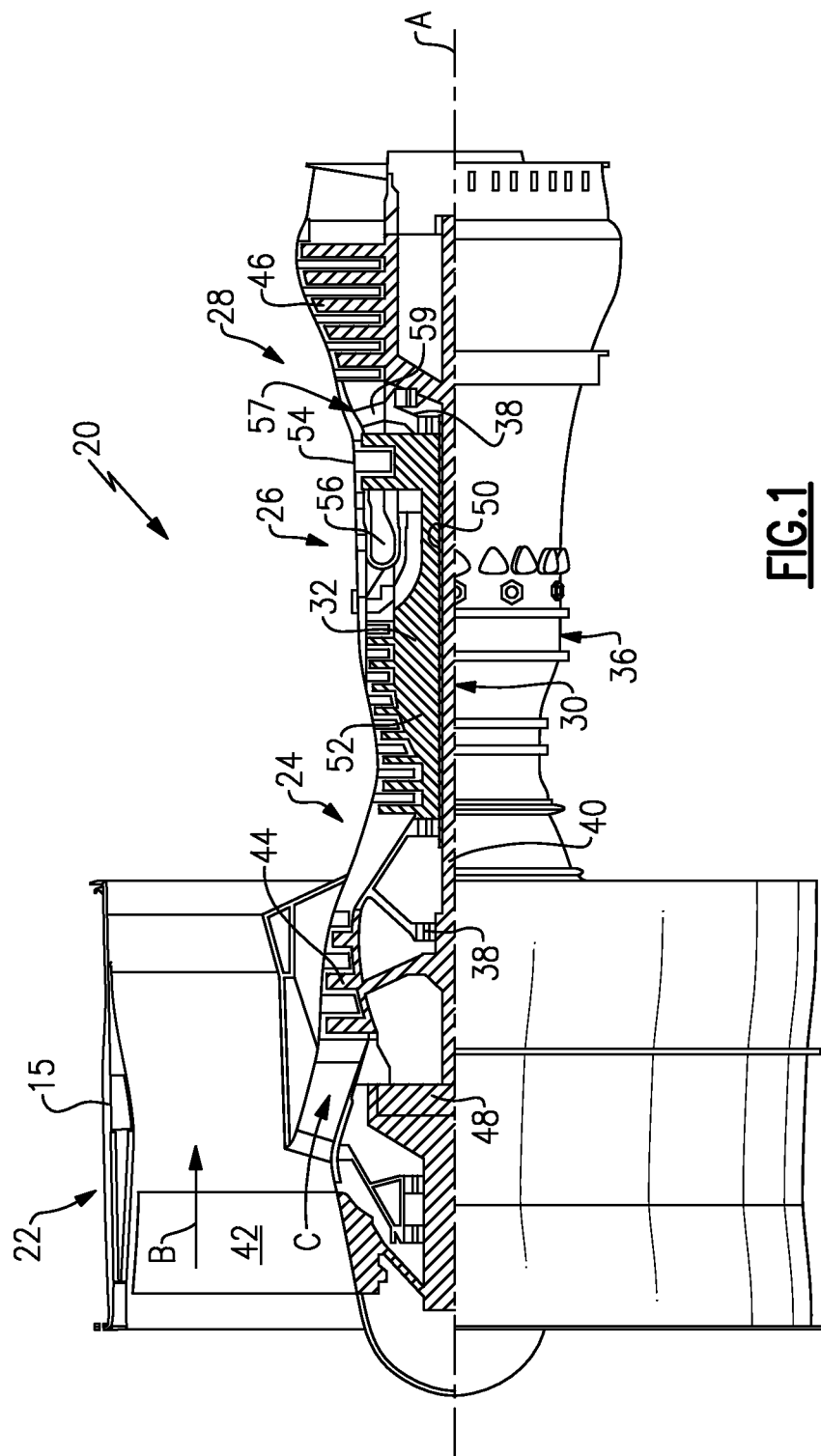
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Airfoils located downstream of combustor section 26, such as stator vanes and rotor blades in the turbine section 28 for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80. The cooling channels internal to the airfoil section 66 can take various forms.

FIG. 4 shows an example of two adjacent blades 60 where the airfoil sections 66 are connected to the platforms 64 via a radiused or curved surface referred to as a fillet region 88. This fillet region 88 is subject to high stress concentrations. Further, this fillet region 88 is difficult to cool. As known, the fillet region 88 is subject to vortex flow paths, indicated generally at 90, which further increase the difficulty in cooling this region.

Figure 5:
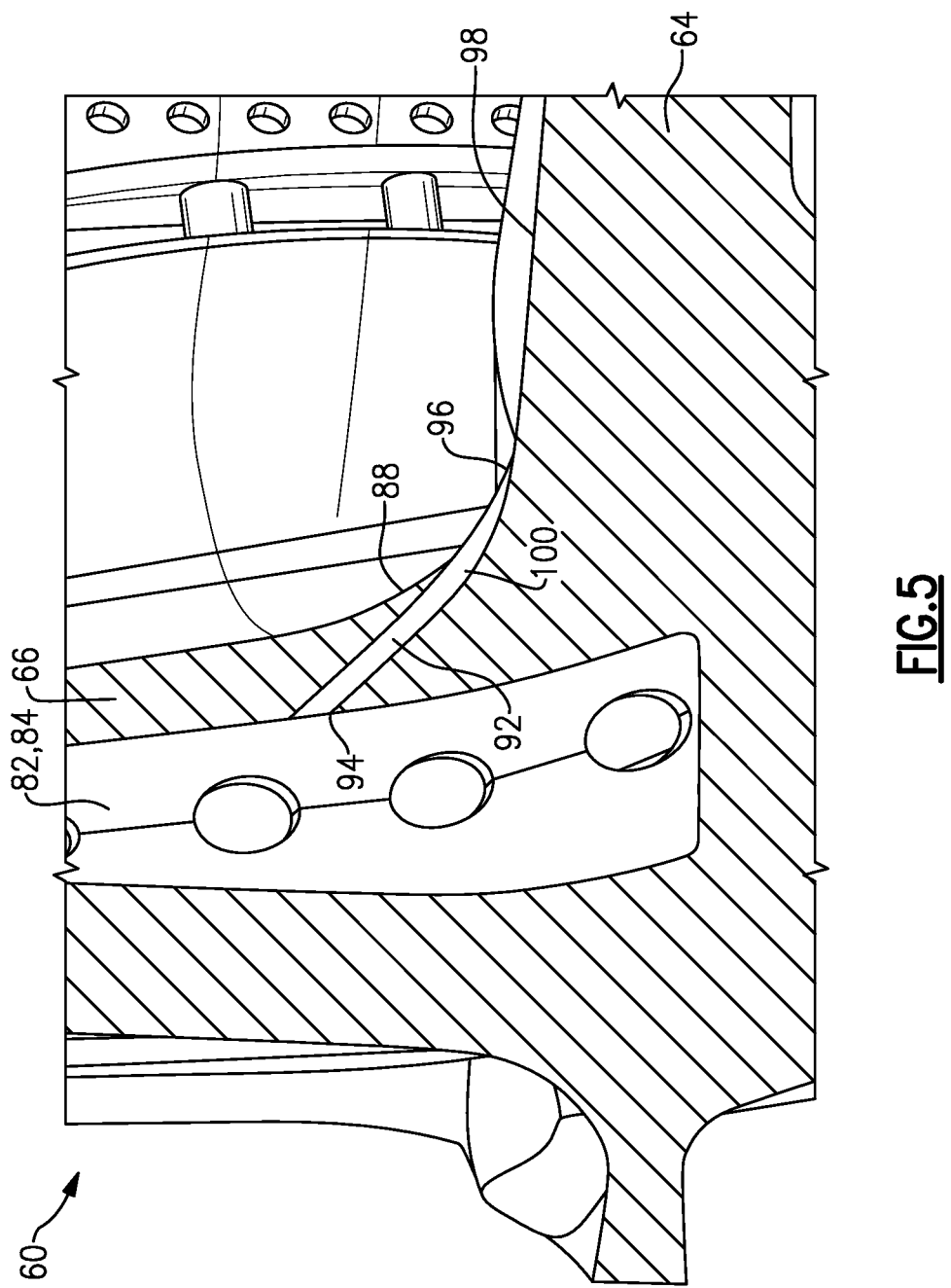
FIG. 5 is a cross-sectional side view of an internal cavity in a blade and a conformal cooling hole in the fillet region.

In the example shown in FIG. 5, an enlarged view of the fillet region 88 is shown between the airfoil section 66 and the platform 64. At least one cooling path is formed within the component to cool the fillet region 88. In this example, the cooling path comprises one or more cooling holes 92 in the fillet region 88, which increase cooling capacity at this location. The cooling hole 92 includes an inlet 94 that is in fluid communication with the internal cooling channel 82, 84 in the airfoil section 66 and an outlet 96. The outlet 96 directs film cooling flow along a surface 98 of the platform 64 at the fillet region 88. The cooling hole 92 extends between the inlet 94 and the outlet 96 and has at least one portion 100 that conforms in shape to the curved surface of the fillet region 88. In other words, the cooling hole 92 includes a portion that matches the curved profile of the fillet region 88.

The cooling hole 92 follows along the curvature of the fillet to an exit at the outlet 96 that is tangent to the radius of the fillet. This curve shaping of the film cooling hole 92 allows the film cooling hole to travel through the fillet region 88 allowing a significantly larger amount of convective cooling than prior cooling hole configurations. Additionally, the tangency of the hole ejection further augments fillet cooling through very low angled film ejection angles leading to better film cooling performance. While only one cooling hole is shown in FIG. 5, it should be understood that multiple cooling holes 92 could be provided to have outlets 96 spaced along the fillet region 88 from the leading edge 68 to the trailing edge 70 (FIG. 2).

FIG. 6 shows an example of a vane 102 having a vane platform 104 and an airfoil section 106. In this example, a cooling path comprises one or more cooling holes 108 that are formed in the fillet region 88 to increase cooling capacity. The cooling hole 108 includes an inlet 110 that is formed at an inner diameter surface 112 of the platform 104 and an outlet 114. The outlet 114 directs film cooling flow along a surface 116 of the airfoil section 106 at the fillet region 88. The cooling hole 108 extends between the inlet 110 and the outlet 114 and has at least one portion 118 that conforms in shape to the curved surface of the fillet region 88 such that the portion 118 matches the curved profile of the fillet region 88.

The cooling hole 108 follows along the curvature of the fillet from the entrance at the inlet 110, which is tangent to the radius of the fillet, to an exit at the outlet 114 that is tangent to the radius of the fillet. Thus, in this example the cooling hole 108 defines an internal curved hole surface 120 that curves from the inlet 110 to the outlet 114. In this example, the outlet 114 is formed in the airfoil section 106 adjacent an outward portion of the fillet region 88 spaced away from the platform 104 such that cooling air flow is directed toward an outer area of the vortex flow path 90 (FIG. 4).

The cooling hole 92 as shown in the blade example of FIG. 5 could also be formed to be curved along an entire length of the hole. Further, while the holes 92, 108 include portions 100, 118 that conform to the curvature of the fillet region 88, the holes could also include one or more straight portions formed in the airfoil sections or platforms to reach desired entrance and exit positions.

While the examples of FIGS. 5-6 show fillet regions for a blade and vane, the cooling holes could also be used at other fillets located in high temperature regions such as blade outer air seals (BOAS), rotor disk attachment areas, or combustor liners/panels, for example. FIG. 7 is a schematic section view of a fillet region 88 for a BOAS or panel member 130 where a cooling hole 132 includes a portion 134 that is curved to conform to the curved surface.

Further, while in the examples shown above the cooling paths are formed as cooling holes; the cooling paths could also comprise internal cooling channels within the various components. For example, the cooling path could comprise one or more of the internal cooling channels 82, 84 (FIG. 3) of the airfoil section 66 where a curvature of the cooling channel is aligned with a curvature of a corresponding fillet. Other vascular cooling channels for other components could also be formed to align a curvature of the channel with a curvature of a corresponding fillet.

In each example, the cooling holes or channels are formed to align a curvature of the hole or channel with the stress field of the fillet itself. The cooling holes or channels are each defined by a radius of curvature that has an oblique tangential intersection with the fillet region 88.

The cooling paths of the subject invention cannot be formed using traditional machining/drilling operations. In one example, an additive manufacturing process is used to form the components and cooling paths. An additive manufacturing process can, for example, create a negative for casting one or more features of the cooling circuit. Any additive manufacturing process can be used to form the gas turbine engine component with conformal film cooling paths in the fillet region. This process allows for maximizing cooling capacity for the fillet without increasing stress concentrations.

As such, using an additive process to create the component allows for extremely detailed, intricate, and adaptive feature configurations. This technology increases the design space of the components and allows for a much higher degree of manufacturing robustness and adaptability. Further, it enables the elimination of costly manufacturing tooling and allows for the 3D definition of the component to be made to be the only tooling needed for storage.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cooling circuit for a gas turbine engine comprising:
   a gas turbine engine component comprising an airfoil and having a first portion connected to a second portion via a curved surface that comprises a fillet region that is defined by a width and a length that extends in a direction that is from a leading edge toward a trailing edge of the gas turbine engine component, and wherein the length is greater than the width;
   an inlet formed in or near one of the first and second portions to receive a cooling air flow;
   an outlet formed at the fillet region to direct cooling flow along a surface of the gas turbine engine component; and
   at least one cooling path extending between the inlet and the outlet in a direction across the width of the curved surface, and wherein the at least one cooling path includes a straight portion and only once curved portion, and wherein the outlet is formed in the curved portion and the inlet is located at an internal cooling channel that is internal to the airfoil.

2. The cooling circuit according to claim 1 wherein the outlet is tangential to the curved surface.

3. The cooling circuit according to claim 1 wherein the gas turbine engine component comprises one of a blade or a vane, and wherein the at least one cooling path comprises at least one of a cooling hole or cooling channel.

4. The cooling circuit according to claim 3 wherein the gas turbine engine component comprises a vane with the first portion comprising a platform and the second portion comprising the airfoil connected to the platform via the curved surface which forms the fillet region, and wherein the length of the fillet region extends in direction that is from the leading edge toward the trailing edge of the airfoil, and wherein the cooling path curves at least partially across the width of the fillet region.

5. The cooling circuit according to claim 3 wherein the gas turbine engine component comprises a blade with the first portion comprising a platform and the second portion comprising the airfoil connected to the platform via the curved surface which forms the fillet region, and wherein the length of the fillet region extends in direction that is from the leading edge toward the trailing edge of the airfoil, and wherein the cooling path curves at least partially across the width of the fillet region.

6. The cooling circuit according to claim 5 wherein the outlet is formed in the platform adjacent an inward portion of the fillet region near the platform such that cooling air flow is directed along an external surface of the fillet region.

7. The cooling circuit according to claim 6 wherein the at least one of a cooling hole or cooling channel comprises a fillet cooling hole or fillet cooling channel, and wherein the inlet to the fillet cooling hole or fillet cooling channel receives cooling air flow from the internal cooling channel.

8. The cooling circuit according to claim 1 wherein the at least one cooling path extending between the inlet and the outlet comprises a plurality of cooling paths each curving from a respective inlet to a respective outlet in a direction across the width of the curved surface, and wherein the outlets are spaced apart from each other along the length of the curved surface.

9. The cooling circuit according to claim 8 wherein the length of the curved surface extends from the leading edge to the trailing edge, and wherein the outlets are spaced apart from each other along the fillet region from the leading edge to the trailing edge.

10. A cooling circuit for a gas turbine engine comprising:
    a gas turbine engine component comprising an airfoil and having a first portion connected to a second portion via a fillet region that comprises a curved surface that is defined by a width and a length that is greater than the width;
    an inlet located at an internal cooling channel that is internal to the airfoil to receive a cooling air flow;
    an outlet formed at the fillet region; and
    at least one cooling path extending between the inlet and the outlet in a direction across the width of the curved surface, and wherein the at least one cooling path includes a straight portion and only one curved portion, and wherein the outlet is formed in the curved portion.

11. The cooling circuit according to claim 10 wherein the at least one cooling path extending between the inlet and the outlet comprises a plurality of cooling paths each curving from a respective inlet to a respective outlet in a direction across the width of the fillet region, and wherein the outlets are spaced apart from each other along the length of the fillet region.

12. The cooling circuit according to claim 11 wherein the length of the fillet region extends from a leading edge to a trailing edge, and wherein the outlets are spaced apart from each other along the fillet region from the leading edge to the trailing edge.

13. The cooling circuit according to claim 10 wherein the gas turbine engine component comprises a blade with the first portion comprising a platform and the second portion comprising the airfoil connected to the platform via the fillet region.

* * * * *

UNITED STATES PATENT AND TRADEMARK OFFICE
CERTIFICATE OF CORRECTION

PATENT NO. : 10,612,392 B2
APPLICATION NO. : 14/923511
DATED : April 7, 2020
INVENTOR(S) : Thomas N. Slavens and Brooks E. Snyder Page 1 of 1

It is certified that error appears in the above-identified patent and that said Letters Patent is hereby corrected as shown below:

In the Claims

In Claim 1, Column 7, Line 39; replace "and only once curved" with --and only one curved--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*